United States Patent
Rollet

(10) Patent No.: US 10,148,645 B2
(45) Date of Patent: Dec. 4, 2018

(54) METHOD AND DEVICE FOR CLASSIFYING TCP CONNECTION CARRYING HTTP TRAFFIC

(71) Applicant: MITSUBISHI ELECTRIC CORPORATION, Tokyo (JP)

(72) Inventor: Romain Rollet, Rennes (FR)

(73) Assignee: Mitsubishi Electric Corporation, Tokyo (JP)

(*) Notice: Subject to any disclaimer, the term of this patent is extended or adjusted under 35 U.S.C. 154(b) by 189 days.

(21) Appl. No.: 15/111,232

(22) PCT Filed: Feb. 26, 2015

(86) PCT No.: PCT/JP2015/056443
§ 371 (c)(1),
(2) Date: Jul. 13, 2016

(87) PCT Pub. No.: WO2015/133557
PCT Pub. Date: Sep. 11, 2015

(65) Prior Publication Data
US 2016/0337333 A1    Nov. 17, 2016

(30) Foreign Application Priority Data

Mar. 7, 2014 (EP) ..................................... 14158365

(51) Int. Cl.
*H04L 29/06* (2006.01)
*H04L 12/26* (2006.01)
(Continued)

(52) U.S. Cl.
CPC ............ *H04L 63/083* (2013.01); *H04L 43/18* (2013.01); *H04L 61/1511* (2013.01);
(Continued)

(58) Field of Classification Search
None
See application file for complete search history.

(56) References Cited

U.S. PATENT DOCUMENTS

| 2005/0102414 A1* | 5/2005 | Hares | H04L 45/00 709/232 |
| 2012/0311027 A1* | 12/2012 | Salusky | H04L 63/126 709/203 |

* cited by examiner

*Primary Examiner* — William J. Goodchild
(74) *Attorney, Agent, or Firm* — Birch, Stewart, Kolasch & Birch, LLP

(57) ABSTRACT

For classifying a TCP connection carrying HTTP traffic as trusted or untrusted, an analyzer device performs: detecting an HTTP request message of an HTTP session carried by the TCP connection; obtaining, from headers of the detected HTTP request message, information to build a signature of the HTTP session; comparing the built signature with signatures stored beforehand in a signatures database; classifying the TCP connection as trusted, when the built signature matches a signature that is stored beforehand in the signatures database and that is representative of a trusted HTTP client application; performing an authentication procedure, when the built signature does not match any signature stored beforehand in the signatures database, the authentication procedure requesting a user to provide authentication data; adding the built signature in the signatures database, when valid authentication data are provided by the user, the signature of the HTTP session being representative in the signatures database of a trusted HTTP client application, and classifying the TCP connection as trusted; and otherwise, classifying the TCP connection as untrusted.

14 Claims, 5 Drawing Sheets

Figure 1:
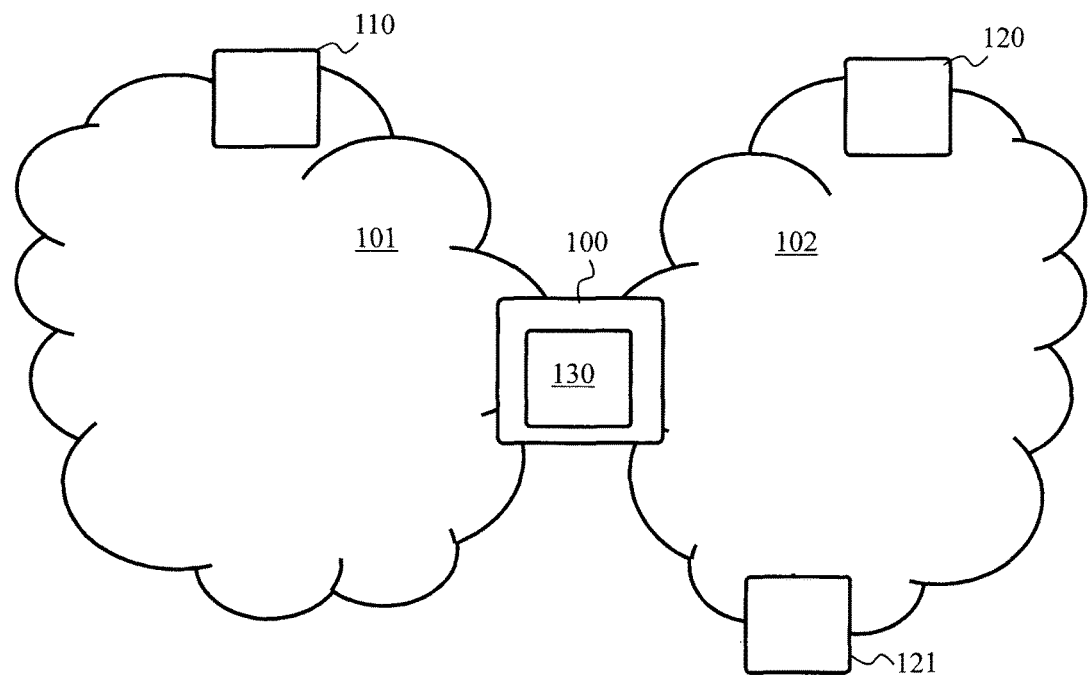

(51) Int. Cl.
*H04L 29/12* (2006.01)
*H04L 29/08* (2006.01)
(52) U.S. Cl.
CPC .......... *H04L 63/08* (2013.01); *H04L 63/1416* (2013.01); *H04L 67/02* (2013.01); *H04L 67/146* (2013.01); *H04L 69/16* (2013.01); *H04L 69/22* (2013.01); *H04L 63/0876* (2013.01); *H04L 63/168* (2013.01)

METHOD AND DEVICE FOR CLASSIFYING TCP CONNECTION CARRYING HTTP TRAFFIC

The present invention generally relates to classifying TCP connections carrying HTTP traffic as trusted or untrusted TCP connections.

The HTTP ("Hypertext Transfer Protocol", as defined by the normative document RFC 2616 published by IETF ("Internet Engineering Task Force")) protocol is transported over TCP ("Transmission Control Protocol", as defined by the normative document RFC 793) segments. The HTTP protocol can be considered as part of a session level. Nowadays, the HTTP protocol becomes the most used session protocol, not only in terms of volume, but also in terms of variety of services relying on the HTTP protocol. Indeed, more and more applications run within a web browser environment, or implement web browser functionalities, and their communications are based on the HTTP protocol. One advantage of the HTTP protocol is simplicity, since the HTTP protocol supports a few number of request methods, and basically applications mostly use two or three of them (e.g. the GET and POST requests). Many applications use the HTTP protocol as a session protocol. The HTTP protocol is not only used by web browsers, but the HTTP protocol is also used by many software applications as the preferred way to download files. So, many software update procedures rely on the HTTP protocol. Instant messaging or cloud services may also use the HTTP protocol as session layer.

Implementing the HTTP protocol is quite flexible and may support some large semantic and syntax variations. Indeed, the HTTP protocol is a text based protocol and is not case sensitive. The normative document RFC 2616 defines some standardized HTTP headers with predefined values, but very few of them are mandatory in HTTP messages used by HTTP client applications and HTTP server applications. Some additional headers were defined by other normative documents for some particular functionalities, such as proxy, file exchange, . . . . In addition, some proprietary HTTP headers may also be defined by any applications, and their usage are not restricted.

The values of some standardized HTTP header fields may depend on the application generating the corresponding HTTP messages, or on the regional setting of a terminal used for running said application. According to one example, the HTTP protocol defines a "User-Agent" header that is intended to identify the application that generates the HTTP message. The User-Agent header typically contains software version information about the HTTP client application and about an operating system on top of which runs the HTTP client application. According to another example, the HTTP protocol defines an "Accept-Language" header that is intended to define a set of natural languages that are preferred to form a response to a request that includes such an "Accept-Language" header.

Therefore, it appears that, even though implementations of the HTTP protocol rely on a same HTTP API ("Application Programming Interface"), different HTTP headers may be present in different orders, and with a different syntax used to encode the header values.

Malicious applications such as malware, Trojan or Remote Administration Tools (RAT) also often use the HTTP protocol as a carrying protocol for setting up communications between the device on which run the malicious application, referred to as infected device, and a server, referred to as Command & Control (C&C) server, under the control of someone who propagated the malicious application.

Methods have been proposed to detect and classify malicious HTTP data flows. However, said methods typically rely on URL ("Uniform Resource Locator") and IP ("Internet Protocol", as defined by RFC 791) destination address analysis to detect potential threat and leakage. Some URLs black lists are typically used to isolate suspicious communications and some URLs white lists are typically used to authorize trusted communications. A similar approach is used with IP addresses black lists and white lists.

A major issue with the aforementioned methods is that relying on IP addresses and URLs may not be reliable. Indeed, untrusted machines or URLs may appear without being reflected on a short-term basis in the white and black lists. Management of white and black lists typically rely on a central approach, wherein the white and black lists are updated by a human administrator upon discovery of new machines acting as servers, or of services pointed by new URLs, in malicious software arrangements.

Another major issue with the aforementioned methods is that they rely on databases that are typically populated off-line in a centric manner. It means that the databases are updated once an operator has discovered a new IP address or a new URL to be whitelisted or blacklisted. This might therefore not be adapted to users' environments. It is therefore desirable to provide a solution that allows populating such databases in a simpler and more efficient way.

It is desirable to overcome the aforementioned drawbacks of the state of the art.

In particular, it is desirable to provide a solution that allows classifying TCP connections carrying HTTP traffic as trusted or untrusted TCP connections, on the basis of information more reliable than IP addresses and URLs.

It is thus desirable to provide a solution that brings improved classifying performance compared with the prior art solutions.

In particular, it is desirable to provide a solution that is reactive to a propagation of new malicious software.

It is furthermore desirable to provide a solution that is easy-to-implement and that is cost-effective.

To that end, the present invention concerns a method for classifying a TCP connection carrying HTTP traffic as a trusted or an untrusted TCP connection, the method being performed by an analyser device. The method comprises: detecting an HTTP request message of an HTTP session in the HTTP traffic carried by the TCP connection; obtaining, from headers of the detected HTTP request message, information to build a signature of the HTTP session; comparing the signature of the HTTP session with signatures stored beforehand by the analyser device in a signatures database; classifying the TCP connection as a trusted connection, when the signature of the HTTP session matches a signature that is stored beforehand by the analyser device in the signatures database and that is representative of a trusted HTTP client application; performing an authentication procedure, when the signature of the HTTP session does not match any signature stored beforehand by the analyser device in the signatures database, the authentication procedure requesting a user to provide authentication data; adding the signature of the HTTP session in the signatures database, when valid authentication data are provided by the user, the signature of the HTTP session being representative in the signatures database of a trusted HTTP client application, and classifying the TCP connection as a trusted connection; and otherwise, classifying the TCP connection as an untrusted connection.

Thus, the signatures database can be populated in a simple and efficient manner, such that the contents of the signatures database is adapted to the user's environment.

According to a particular embodiment, when the TCP connection is classified as an untrusted connection following the authentication procedure, the method further comprises: adding the signature of the HTTP session in the signatures database, the signature of the HTTP session being representative in the signatures database of an untrusted HTTP client application.

Thus, the signatures database comprise information relative to both trusted and untrusted HTTP client applications.

According to a particular embodiment, each signature stored in the signatures database is associated with a first safety indicator representative of whether said signature corresponds to a trusted TCP connection or an untrusted TCP connection.

Thus, determining whether a stored signature corresponds to a TCP connection or an untrusted TCP connection According to a particular embodiment, the signature of the HTTP session includes information representative of HTTP mandatory headers present in the detected HTTP request message, information representative of HTTP optional headers present in the detected HTTP request message, information representative of a sequence in which the HTTP mandatory headers appear in the detected HTTP request message; and information representative of values contained in predefined fields of the HTTP mandatory headers present in the detected HTTP request message.

Thus, by relying on HTTP headers presence, on HTTP headers sequence and of values contained in predefined fields of the HTTP mandatory headers, classifying the TCP connections is more reliable.

According to a particular embodiment, the signatures stored in the signatures database are associated with a set of at least one IP address, said method comprises: associating the signature of the HTTP session with an IP source address from which is originated the HTTP request message, when adding the signature of the HTTP session in the signatures database; checking whether the IP source address is associated with any signature stored beforehand in the signatures database, when comparing the signature of the HTTP session with the signatures stored beforehand in the signatures database; and considering that the signature of the HTTP session does not match any signature in the signatures database, when no signature in the signatures database is associated with the IP source address.

Thus, by associating the signature of the HTTP session with an IP source address, classifying TCP connections is more accurate and is dynamically adapted to the user's environment. It further allows having a fine overview of what HTTP client applications runs on what device and limiting risks of spoofing by malicious HTTP client applications.

According to a particular embodiment, the authentication procedure comprises: sending a response to a device having originated the detected HTTP request message, said response redirecting the device having originated the detected HTTP request message toward another URL; receiving from the device having originated the detected HTTP request message another HTTP request message referring to said another URL; sending in response to said another HTTP request message a web page via which the user is able to enter authentication information; and, when valid authentication information is received, considering the TCP connection as trusted, otherwise considering the TCP connection as untrusted.

Thus, authentication is expected to be performed only by humans, which should avoid declaring a TCP connection as trusted whereas said TCP connection involves a malicious HTTP client application.

According to a particular embodiment, the web page is adapted to enable the user to enter a login and a password as authentication information, and the analyser device compares the entered login and passwords with login and password stored beforehand, or the web page is adapted to display a CAPTCHA ("Completely Automated Public Turing test to tell Computers and Humans Apart") image and enable the user to enter a string, and the analyser device compares the entered string with a predefined string corresponding to the displayed CAPTCHA image.

Thus, authentication security is reinforced.

According to a particular embodiment, the web page is further adapted to enable the user to select a profile from amongst a set of profiles determined by the analyser device as compatible with the detected HTTP request message, each profile including a list of HTTP mandatory headers expected to be present in each HTTP request message compliant with the signature, a list of HTTP optional headers expected to be present in each HTTP request message compliant with the signature, a list of HTTP mandatory headers having specific values to be present in each HTTP request message compliant with the signature, and information representative of a sequence in which the HTTP mandatory headers appear in the detected HTTP request message.

Thus, relying on profiles eases the definition of the signature to be added in the signatures database.

According to a particular embodiment, when valid authentication information is received, the analyser device determines the signature of the HTTP session from the selected profile and headers of the detected HTTP request message.

Thus, definition of the signature is further eased.

According to a particular embodiment, the method comprises: obtaining information representative of an IP destination address associated with the detected HTTP request message; and attempting classifying the TCP connection as a trusted or an untrusted TCP connection, on the basis of the IP destination address prior to attempting classifying the TCP connection on the basis of the signature.

Thus, the signature-based classification approach is implemented once a simpler, IP address-based, classification approach has been attempted without success.

According to a particular embodiment, the method comprises: comparing the IP destination address with IP addresses stored beforehand in an IP addresses database, each IP address stored in the IP addresses database being associated with a second safety indicator representative of whether said IP address corresponds to a trusted device or an untrusted device, each TCP connection implying a trusted destination device being considered as trusted and each TCP connection implying an untrusted destination device being considered as untrusted.

Thus, the IP address-based simpler classification approach is simple to implement. It moreover allows classifying more easily legitimate HTTP client applications that access one or few domains, such as software update HTTP client applications.

According to a particular embodiment, for populating the IP addresses database, the method comprises: receiving UDP ("User Datagram Protocol") datagrams; detecting a DNS ("Domain Name System") server response in the received UDP datagrams; obtaining, from the detected DNS server response, information of matching between an IP address and domain name information; checking whether said domain name information is present in a domain name database, said domain name database containing domain names associated with a third safety indicator representative of whether said domain name is trusted or untrusted; when said domain name information is present in the domain name database, adding to the IP addresses database the IP address matching said domain name information in association with the third safety indicator.

Thus, the IP addresses database can be automatically populated.

According to a particular embodiment, the method comprises: obtaining, from headers of the detected HTTP request message, information representative of an URL to which refers the HTTP request message; and attempting classifying the TCP connection as a trusted or an untrusted TCP connection, on the basis of the URL prior to attempting classifying the TCP connection on the basis of the signature.

Thus, the signature-based classification approach is implemented once a simpler, URL-based, classification approach has been attempted without success. It moreover allows classifying more easily legitimate HTTP client applications that access one or few domains, such as software update HTTP client applications.

According to a particular embodiment, the method comprises: comparing the URL with URLs stored beforehand in a URLs database, each URL stored in the URLs database being associated with a fourth safety indicator representative of whether said URL corresponds to a trusted device or an untrusted device, each TCP connection transporting an HTTP request message referring to a trusted URL being considered as trusted and each TCP connection implying an untrusted URL being considered as untrusted.

Thus, the URL-based simpler classification approach is simple to implement.

According to another aspect, the present invention also concerns a device for classifying a TCP connection carrying HTTP traffic as a trusted or an untrusted TCP connection. Said device comprises: means for detecting an HTTP request message of an HTTP session in the HTTP traffic carried by the TCP connection; means for obtaining, from headers of the detected HTTP request message, information to build a signature of the HTTP session; means for comparing the signature of the HTTP session with signatures stored beforehand by the analyser device in a signatures database; means for classifying the TCP connection as a trusted connection, when the signature of the HTTP session matches a signature that is stored beforehand by the analyser device in the signatures database and that is representative of a trusted HTTP client application; means for performing an authentication procedure, when the signature of the HTTP session does not match any signature stored beforehand by the analyser device in the signatures database, the authentication procedure requesting a user to provide authentication data; means for adding the signature of the HTTP session in the signatures database, when valid authentication data are provided by the user, the signature of the HTTP session being representative in the signatures database of a trusted HTTP client application, and for classifying the TCP connection as a trusted connection; and otherwise, means for classifying the TCP connection as an untrusted connection.

The present invention also concerns a computer program that can be downloaded from a communications network and/or stored on a medium that can be read by a computer and run by a processor. This computer program comprises instructions for implementing the aforementioned method in any one of its embodiments, when said program is run by the processor. The present invention also concerns information storage means, storing such a computer program.

Since the features and advantages related to the device and to the computer program are identical to those already mentioned with regard to the corresponding aforementioned method, said features and advantages are not repeated here.

Figure 2:
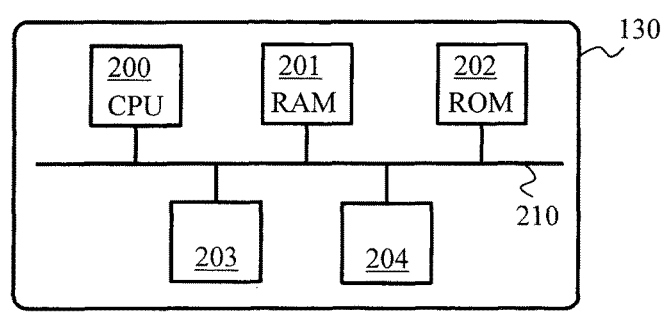
Figure 3:
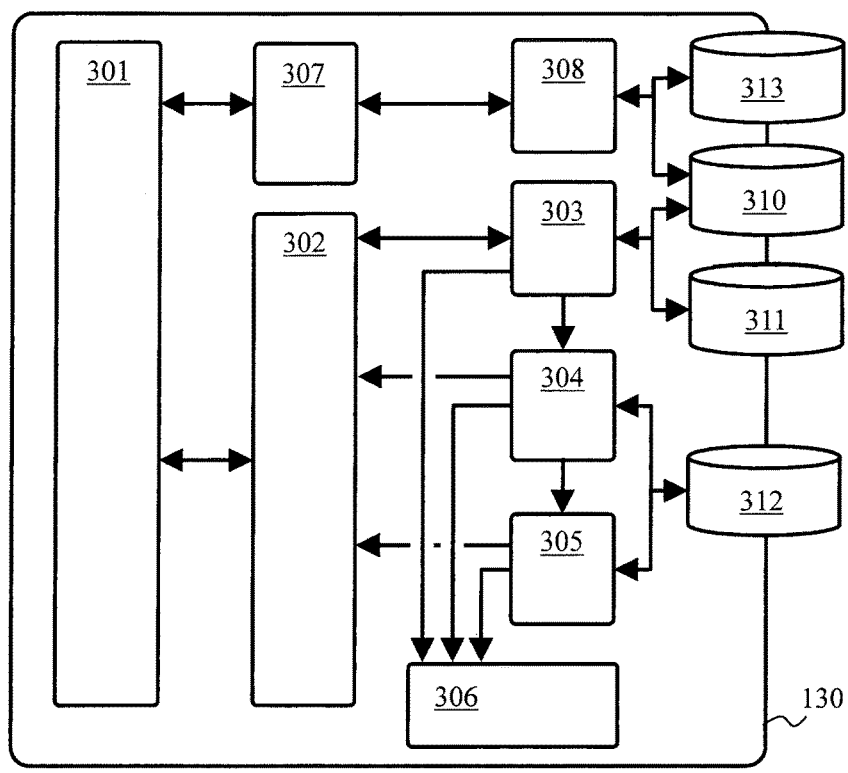
Figure 4:
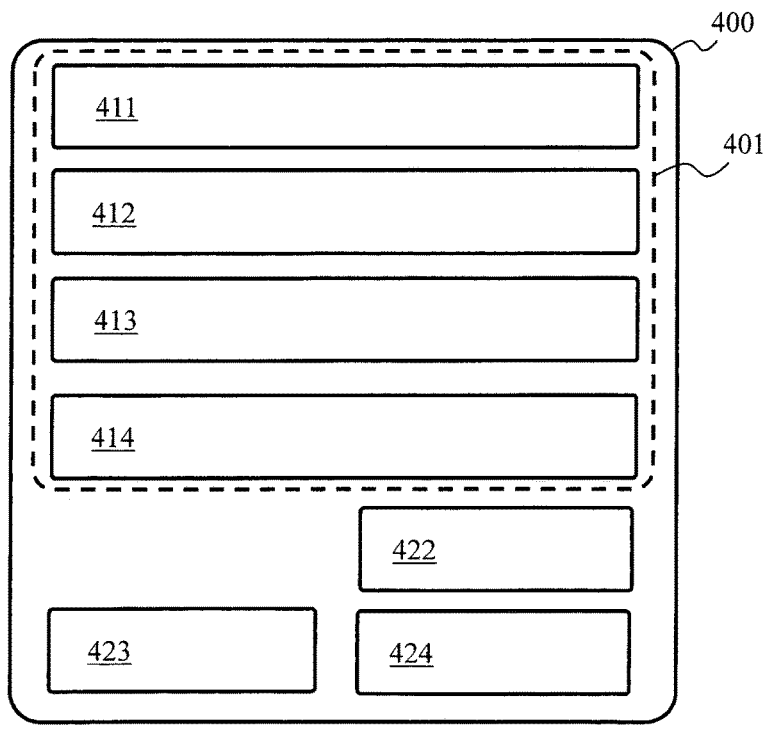
Figure 5:
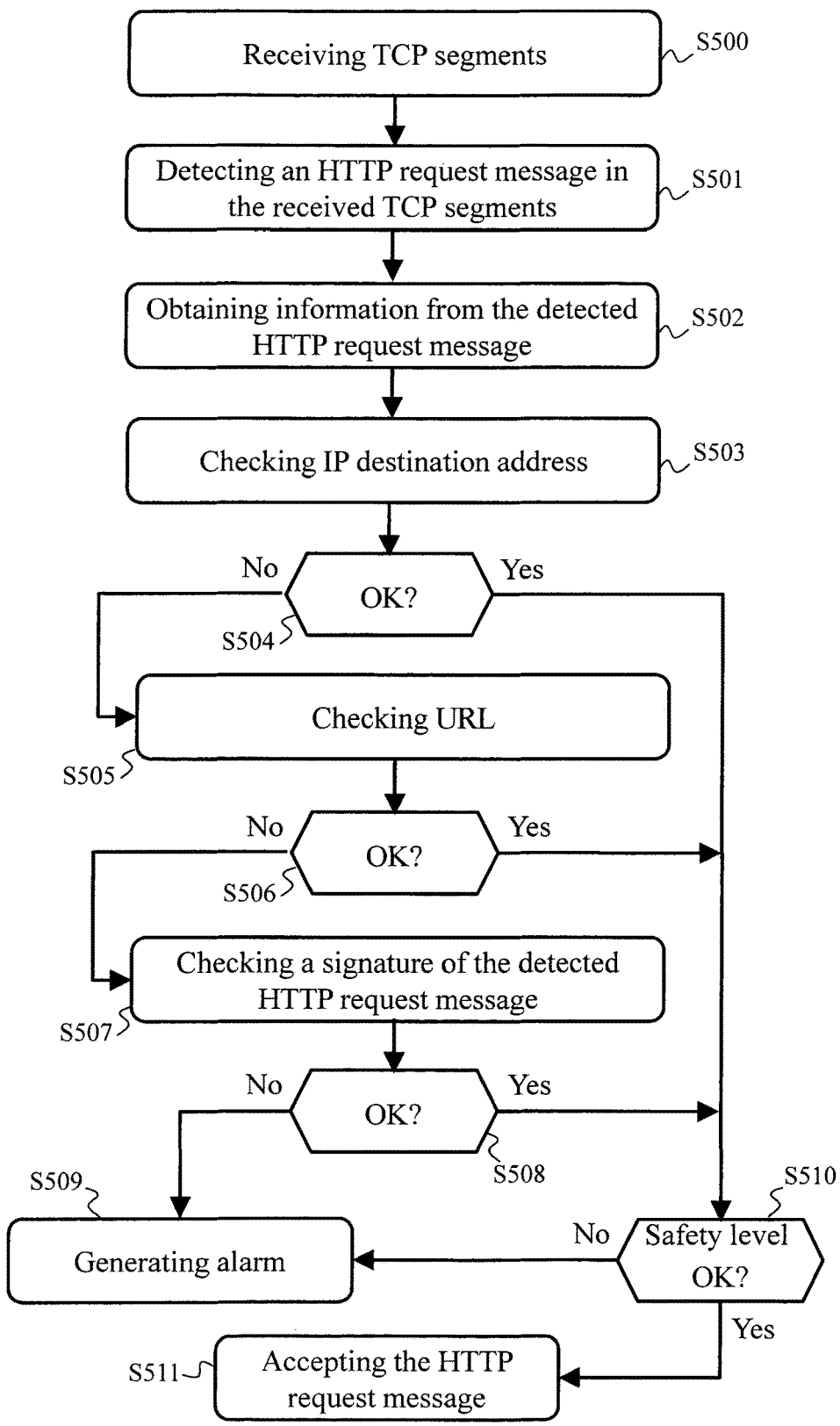
Figure 6:
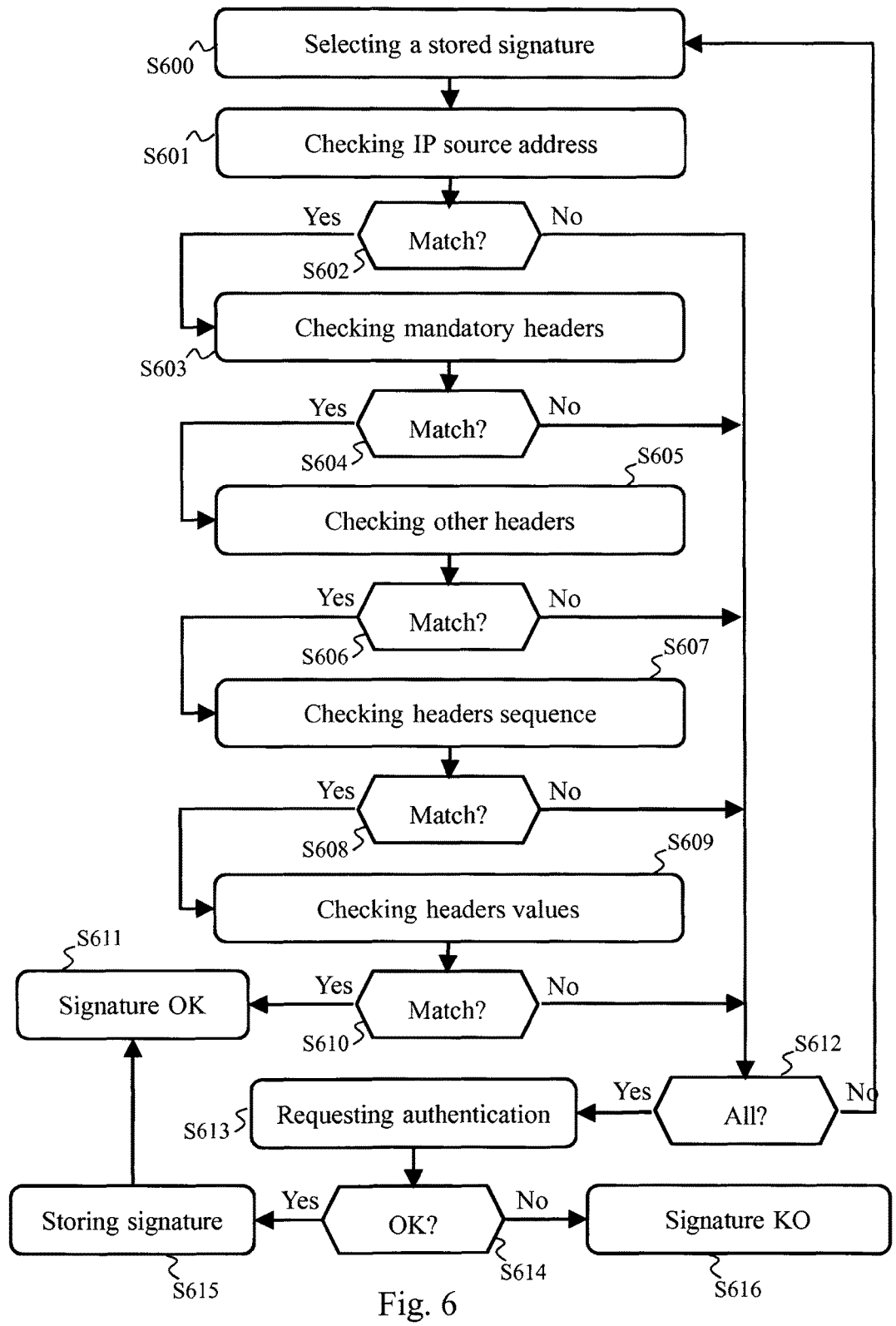
Figure 7:
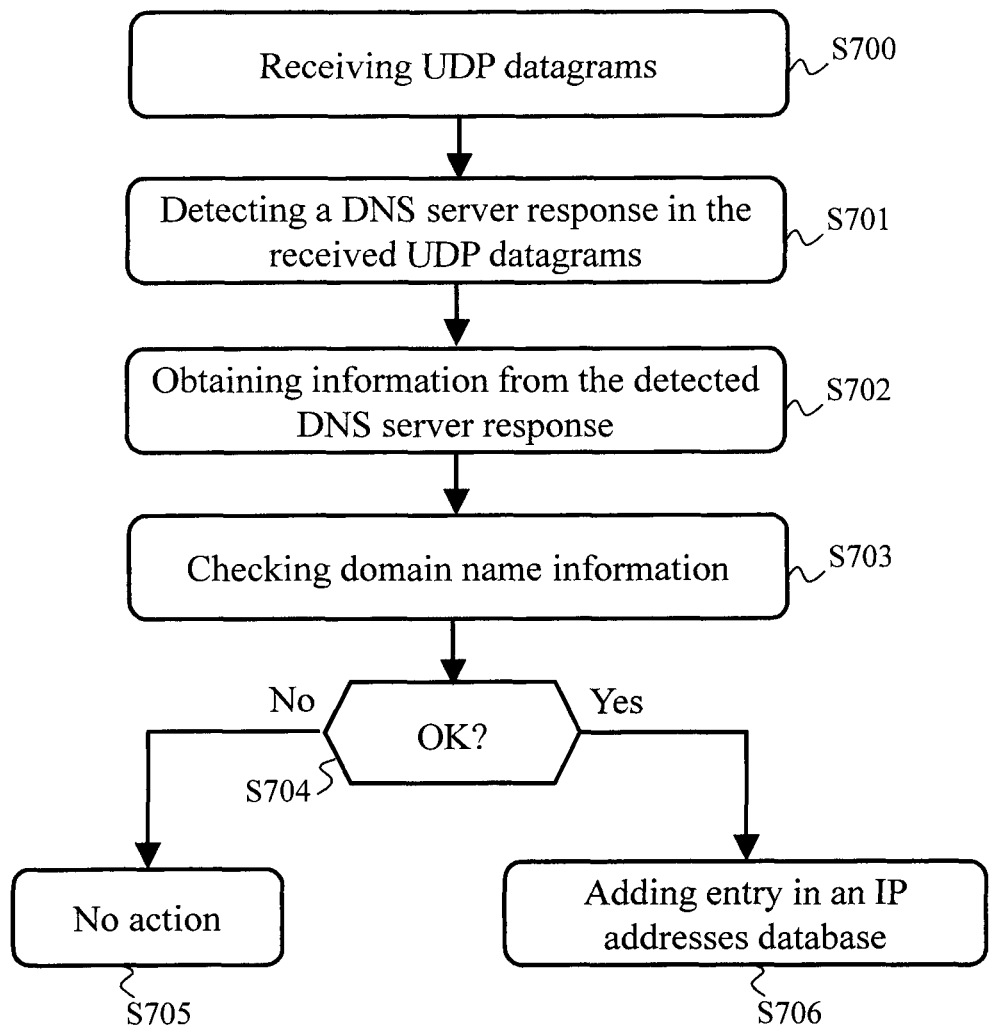

The characteristics of the invention will emerge more clearly from a reading of the following description of an example of embodiment, said description being produced with reference to the accompanying drawings, among which:

FIG. 1 schematically represents a communication system in which the present invention may be implemented;

FIG. 2 schematically represents an architecture of an analyser device of the communication system;

FIG. 3 schematically represents a modular arrangement of the analyser device;

FIG. 4 schematically represents an example of structure for storing signature information in a signatures database;

FIG. 5 schematically represents an algorithm, performed by the analyser device, for classifying TCP connections;

FIG. 6 schematically represents an algorithm, performed by the analyser device, for checking signatures of TCP connections, and for, when needed, updating the signatures database; and FIG. 7 schematically represents an algorithm, performed by the analyser device, for adding new entries in an IP addresses database.

In order to improve performance in classifying TCP connections carrying HTTP traffic as trusted or untrusted connections in a context of detecting applications out of user's control (e.g. malware, rootkit) and in order to dynamically adapt classification of the TCP connections according to the user's environment, it is proposed to determine a HTTP session signature from information included in HTTP request messages in the HTTP traffic and to further determine whether the determined signature matches a signature stored beforehand in a signatures database. When the signature matches a signature stored in the signatures database, a safety indicator associated with the stored signature indicates whether the TCP connection has to be classified as a trusted TCP connection or as an untrusted TCP connection. And, when the determined signature does not match any signature stored beforehand in the signatures database, a user authentication procedure is performed and the determined signature is added to the signatures database. When valid user authentication data are received within the user authentication procedure, the determined signature is preferably associated in the signatures database with a safety indicator indicating that any corresponding TCP connection has to be classified as a trusted TCP connection, and otherwise, the determined signature is preferably associated in the signatures database with a safety indicator indicating that any corresponding TCP connection has to be classified as an untrusted TCP connection. As applications out of user's control (e.g. malware, rootkit) are unable to provide valid user authentication data, the signature database is populated with signatures representative of the user's environment in terms of HTTP client applications. Legitimate HTTP client applications can then be identified when valid user authentication data are received and then associated with a safety indicator indicating that any corresponding TCP connection has to be classified as a trusted TCP connection, whereas HTTP client applications out of user's control can then be identified when no valid user authentication data are received and then associated with a safety indicator indicating that any corresponding TCP connection has to be classified as an untrusted TCP connection.

In a preferred embodiment, the signature is based on the effective presence of HTTP mandatory headers in the HTTP request messages, of HTTP optional headers in the HTTP request messages, the sequence in which the HTTP mandatory headers appear in the HTTP request messages, and respective values of some of the HTTP mandatory headers. Indeed, most applications out of user's control do not pay attention to correctly filling in the HTTP headers and more particularly to the sequence in which the HTTP mandatory headers appear in the HTTP request messages generated by said applications. In other words, legitimate HTTP client applications and suspicious HTTP client applications do not typically fill in the same way the HTTP headers, and do not present the HTTP mandatory headers in a same order (i.e. sequence of the HTTP mandatory headers). This aspect is therefore used to build a signature of the HTTP session to which said HTTP request messages belong, the signature of the HTTP session being then representative of a trusted or untrusted character of the TCP connection (i.e. trusted or untrusted character of the HTTP client application participating in the HTTP session).

FIG. 1 schematically represents a communication system in which the present invention may be implemented.

The communication system comprises an analyser device 130 located on a path via which HTTP traffic is transported between at least one first HTTP device, e.g. web server, and at least one second HTTP device, e.g. web client. HTTP traffic is carried within TCP connections.

In a particular embodiment as shown in FIG. 1, the analyser device 130 is included in a communication device 100. The communication device 100 is adapted to interconnect a first communications network 101 and a second communications network 102. Each first device is connected to the first communications network 101 and each second device is connected to the second communications network 102. FIG. 1 illustratively shows one first device 110 and one second device 120.

The communication device 100 is therefore further adapted to forward to the analyser device 130 TCP segments that are transmitted across the communication device 100, so that to enable the analyser device 130 to detect HTTP traffic conveyed by the TCP segments.

The communication device 100 is typically a residential gateway device, the second communications network 102 is a Local Area Network (LAN) and the first communications network 101 is the Internet. The communication device 100 may interconnect more communications networks. The communication device 100 may be an IP router, a Wi-Fi (registered trademark) access point or a router implementing the same.

The communication system may further comprise a supervisor device 121. The supervisor device 121 is made accessible to the analyser device 130. In one embodiment, when the communication device 100 is a residential gateway device and the second communications network 102 is a LAN, the supervisor device 121 is preferably located on said LAN. The supervisor device 121 is adapted to receive alarms, i.e. in the form of messages via the LAN, from the analyser device 130. The supervisor device 121 is therefore able to provide to a user information representative of said alarms. The supervisor device 121 may further be adapted to interact with the user on behalf of the analyser device 130, in the scope of a user authentication procedure detailed hereafter with regard to FIG. 6.

FIG. 2 schematically represents a hardware architecture of the analyser device 130. According to the shown architecture, the analyser device 130 comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard Disk Drive) 203, or any other device adapted to read information stored on storage means, such as an SD (Secure Digital) card reader; and, a set 204 of communication interfaces, which allows connecting the analyser device 130 to at least one communications network, such as for instance the first communications network 101 and the second communications network 102.

CPU 200 is capable of executing instructions loaded into RAM 201 from ROM 202, from an external memory such as an SD card, or from HDD 203. After the analyser device 130 has been powered on, CPU 200 is capable of reading instructions from RAM 201 and executing these instructions. The instructions form one computer program that causes CPU 200 to perform some or all of the steps of the algorithms described hereafter.

Any and all steps of the algorithms described hereafter may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an example of modular arrangement of the analyser device 130.

The analyser device 130 comprises a transceiver module 301. The transceiver module 301 is adapted to receive TCP segments from each communications network to which the communication device 100 is connected and to propagate, when needed, the received TCP segments so that said TCP segments can continue their route toward their respective addressees. The transceiver module 301 may further be adapted to receive UDP ("User Datagram Protocol", as defined by the normative document RFC 768) datagrams from each communications network to which the communication device 100 is connected and to propagate the received UDP datagrams so that said UDP datagrams can continue their route.

The analyser device 130 further comprises a TCP analyser module 302 in charge of performing a state monitoring of each opened TCP connection, of re-assembling TCP segments that conveys in a segmented manner a single HTTP request message. To do so, the TCP analyser module 302 is adapted to receive the TCP segments from the transceiver module 301.

The TCP analyser module 302 is further adapted to detect TCP segments corresponding to non-HTTP request messages and to send back said TCP segments to the transceiver module 301 so that said TCP segments can continue their route toward their addresses. The TCP analyser module 302 is further adapted to detect TCP segments corresponding to HTTP request messages and to send said TCP segments to an URL/IP-based classifier module 303 for further analysis of the HTTP request messages.

In one embodiment, said HTTP request messages are copied by the TCP analyser module 302 for providing said HTTP request messages to the URL/IP-based classifier module 303, the TCP analyser module 302 being then adapted to propagate the TCP segments in the same sequence (i.e. order) as received by the TCP analyser module 302. Impacts of the analyser device 130 on the form and latency of the TCP connections are thus limited.

In another embodiment, once analysed by the analyser device 130, said HTTP request messages are provided back to the TCP analyser module 302, the TCP analyser module 302 being then adapted to put on-hold other TCP segments in order to ensure propagation of the TCP segments in the same sequence (i.e. order) as received by the TCP analyser module 302. Impacts of the analyser device 130 on the form of the TCP connections are thus limited, only latency being slightly impacted.

In yet another embodiment, said HTTP request messages are provided back to the TCP analyser module 302, when said HTTP request messages are classified as respectively belonging to trusted TCP connections, and a notification is transmitted to the TCP analyser module 302 when said HTTP request messages are classified as respectively belonging to untrusted TCP connections. The TCP analyser module 302 is, in this case, adapted to put on-hold other TCP segments in order to ensure propagation of the TCP segments substantially in the same sequence (i.e. order) as received by the TCP analyser module 302, unless the analyser device 130 withdrew HTTP request messages from untrusted TCP connections.

The analyser device 130 further comprises the URL/IP-based classifier module 303. The URL/IP-based classifier module 303 is adapted to classify TCP connections according to IP destination address values and/or URLs contained in TCP segments conveyed by the TCP connections. The URL/IP-based classifier module 303 is adapted to receive HTTP request messages from the TCP analyser module 302. The URL/IP-based classifier module 303 is adapted to compare IP destination addresses and/or URLs contained in the HTTP request messages with information respectively contained in a IP addresses database 310 and/or in a URLs database 311. Each IP address stored in the IP addresses database 310 and each URL stored in the URLs database 311 are associated with a safety indicator. A safety indicator that is equal to "0" means that the host having the corresponding IP address or toward which points the corresponding URL can be trusted. The corresponding TCP connections are therefore considered as trusted connections. A safety indicator different from "0" means that the host having the corresponding IP address or toward which points the corresponding URL cannot be trusted, i.e. is untrusted. The corresponding TCP connections are therefore considered as untrusted connections.

IP addresses are entered by an administrator into the IP addresses database 310, for instance by using a user interface of the analyser device 130. Such IP addresses may also be stored during manufacturing process of the IP addresses database 310 or of the analyser device 130. Such IP addresses may also be downloaded from a communications network such as the first communications network 101. Such IP addresses may also be automatically added to the IP addresses database 310, as detailed hereafter with regard to FIG. 7.

URLs are entered by an administrator into the URLs database 311, for instance by using a user interface of the analyser device 130. Such URLs may also be stored during manufacturing process of the URLs database 311 or of the analyser device 130. Such URLs may also be downloaded from a communications network such as the first communications network 101.

The analyser device 130 further comprises an HTTP signature-based classifier module 304. The HTTP signature-based classifier module 304 is adapted to classify TCP connections according to HTTP session signatures built from information contained in the HTTP headers of the HTTP request messages. The HTTP signature-based classifier module 304 is adapted to receive, from the URL/IP-based classifier module 303 any HTTP request message that the URL/IP-based classifier module 303 was not able to classify beforehand. The HTTP signature-based classifier module 304 is adapted to compare said signature with signatures stored in a signatures database 312 in order to determine whether the TCP connections are trusted or untrusted.

In a preferred embodiment, the HTTP signature-based classifier module 304 is adapted to build a signature from information representative of effective presence of HTTP mandatory and optional headers in the HTTP request messages, from a sequence in which the HTTP mandatory headers appear in the HTTP request messages and from values indicated in some of the HTTP mandatory headers.

In one embodiment, the analyser device 130 does not comprise the URL/IP based classifier module 303 and the TCP analyser module 302 directly interacts with the HTTP signature-based classifier module 304.

The analyser device 130 further comprises a user authentication module 305. The user authentication module 305 is adapted to perform the authentication procedure in order to determine whether TCP connections that the HTTP signature-based classifier module 304 was not able to classify beforehand are trusted or untrusted. The user authentication module 305 is adapted to launch the authentication procedure, when the HTTP signature-based classifier module 304 was not able to find at least one matching signature in the signatures database 312 for the TCP connections. The user authentication module 305 is therefore adapted to receive, from the HTTP signature-based classifier module 304, any HTTP request message that the HTTP signature-based classifier module 304 was not able to classify beforehand. The user authentication module 305 is further adapted to update the signatures database 312 with signatures for TCP connections that are considered as trusted connections due to successful user authentication, and preferably adapted to update the signatures database 312 with signatures for TCP connections that are considered as untrusted connections due to unsuccessful user authentication.

The analyser device 130 further comprises an alarm generator module 306. The alarm generator module 306 is adapted to provide alarm indications on the basis of error events reported by the URL/IP based classifier module 303 or by the HTTP signature-based classifier 304 or by the user authentication module 305. The alarm generator module 306 is therefore adapted to receive error events from the URL/IP based classifier module 303, and error events from the HTTP signature-based classifier 304, and error events from the user authentication module 305.

In one embodiment, the analyser device 130 further comprises a UDP analyser module 307 and a domain name analyser module 308. The UDP analyser module 307 is in charge of detecting DNS ("Domain Name System") server responses in UDP datagrams and to provide said DNS server responses to the domain name analyser module 308. To do so, the UDP analyser module 307 is adapted to receive the UDP datagrams from the transceiver module 301. In one embodiment, said DNS server responses are copied by the UDP analyser module 307 for providing said DNS server responses to the domain name analyser module 308, the UDP analyser module 307 being then adapted to propagate the UDP datagrams in the same sequence (i.e. order) as received by the UDP analyser module 307. Impacts of the analyser device 130 on the form and latency of the UDP data flows are thus limited. In another embodiment, once analysed by the domain name analyser module 308, said UDP datagrams are provided back to the UDP analyser module 307 for propagating said UDP datagrams. The UDP datagrams may not be propagated in the same sequence (i.e. order) as received, since UDP is a connectionless transport protocol that is flexible regarding datagrams ordering.

The domain name analyser module 308 is adapted to inspect A and/or AAAA records, defined in the normative documents RFC 1035 and RFC 3596, and contained in the DNS server responses. Said records contain an association of an IP address with domain name information. The domain name analyser module 308 is adapted to check whether the domain name information contained in the DNS server responses is present in a domain names database 313. Each domain name information stored in the domain names database 313 is associated with a safety indicator. A safety indicator that is equal to "0" means that the domain name can be trusted. A safety indicator different from "0" means that the domain name cannot be trusted, i.e. is untrusted. Domain name information is entered by an administrator into the domain names database 313, for instance by using a user interface of the analyser device 130. Domain name information may also be stored during manufacturing process of the domain name database 313 or of the analyser device 130. Domain name information may also be downloaded from a communications network such as the first communications network 101. The domain name analyser module 308 is further adapted to add a new entry in the IP addresses database 310, when the domain name information contained in a DNS server response is present in the domain names database 313 and the IP address contained in the record is not yet present in the IP addresses database 310. Said new entry is the IP address contained in the record and is associated with the safety indicator associated with the domain name information stored in the domain names database 313. This allows automatically populating the IP addresses database 310. In a particular embodiment, a predefined time period is associated with said new entry. Said entry is removed by the analyser device 130 from the IP addresses database 310 after expiry of said predefined time period.

The IP addresses database 310 and/or the URLs database 311 and/or the signatures database 312 and/or the domain names database 313 may be integrated in the analyser device 130. Alternatively, the IP addresses database 310 and/or the URLs database 311 and/or the signatures database 312 and/or the domain names database 313 may be separately implemented and then connected to the analyser device 130, for instance via a communications network.

FIG. 4 schematically represents an example of structure 400 for storing signatures in the signatures database 312. The signatures stored in the signatures database 312 at least comprise information representative of HTTP mandatory headers expected to be present in the HTTP request message, information representative of HTTP optional headers expected to be present in the HTTP request message, information representative of a sequence in which the HTTP mandatory headers appear in the HTTP request message, as well as information representative of values contained in predefined fields of the HTTP mandatory headers present in the HTTP request message.

The signatures stored in the signatures database 312 may comprise more information, such as the structure 400 shown in FIG. 4. The structure 400 shown in FIG. 4 then comprises:
- a first list 411 of HTTP mandatory headers;
- a second list 412 of HTTP optional headers;
- a third list 413 of HTTP mandatory headers having predefined fields containing values to be checked;
- information 414 representative of a sequence in which the HTTP mandatory headers appear;
- a set 422 of allowed values for the third list 413 of HTTP mandatory headers having predefined fields containing values to be checked;
- a safety indicator 423; and
- information 424 representative of set of IP source addresses, which could be limited to a single IP source address.

It should be noted that the allowed values for the third list 413 of HTTP mandatory headers may be character strings or regular expressions.

The signature 400 is based on a profile 401. The profile 401 contains the first list 411 of HTTP mandatory headers, the second list 412 of HTTP optional headers, the third list 413 of HTTP mandatory headers and the information 414 representative of the sequence in which the HTTP mandatory headers appear. Profiles are entered by an administrator into the signature database 312, for instance by using a user interface of the analyser device 130. Profiles 401 may also be stored during manufacturing process of the signatures database 312 or of the analyser device 130. Profiles 401 may also be downloaded from a communications network such as the first communications network 101. A single profile may be shared by several signatures.

Signatures are entered by the user authentication module 305 the signature database 312, following the aforementioned authentication procedure The information 424 representative of the set of IP source addresses is filed in by the user authentication module 305 when adding or updating a signature, and defines the IP addresses of the device implementing the HTTP client applications for which the signature has been added in the signatures database 312.

Legitimate HTTP client applications, such as web browsers, generally use the same list of HTTP mandatory headers, the same list of HTTP optional headers, the same sequence of appearance of the HTTP mandatory headers, from one TCP connection to another. Moreover specific values are included in the same predefined fields of the HTTP mandatory headers of the HTTP request messages generated by said legitimate HTTP client applications. Relying on profiles as shown in FIG. 4 therefore allows simplifying the creation of signatures to be inserted in the signatures database 312.

FIG. 5 schematically represents an algorithm, performed by the analyser device 130, for classifying TCP connections.

In a step S500, the analyser device 130 receives TCP segments transmitted from the second device 120 to the first device 110. Indeed, as already mentioned, the analyser device 130 is located on a data path between the first device 110 and the second device 120. In the scope of the modular arrangement shown in FIG. 3, the step S500 is performed by the transceiver module 301.

In a following step S501, the analyser device 130 performs re-assembling on the basis of the received TCP segments and tries to detect an HTTP request message of an HTTP session in the TCP segments after re-assembling. In the scope of the modular arrangement shown in FIG. 3, the step S501 is performed by the TCP analyser module 302.

In a following step S502, the analyser device 130 obtains information from the detected HTTP request message in order to be able to build a signature of the HTTP session. In a preferred embodiment, the analyser device 130 obtains at least information representative of each HTTP mandatory and optional header contained in the HTTP request message, information representative of a sequence in which said HTTP mandatory headers appear in the HTTP request message and information representative of values contained in fields of the HTTP mandatory headers.

The analyser device 130 may further obtain information representative of an IP source address HTTP request message, i.e. the IP address of the device having originated the HTTP request message, information representative of an IP destination address, i.e. the IP address of the device to which is intended the HTTP request message, and information representative of an URL contained in the HTTP request message. The information representative of the IP source address is used to optionally determine whether the second device 120 has been authorized beforehand (by having performed the authentication procedure) for a signature stored in the signatures database 312. The information representative of the IP destination address and the information representative of the URL are used to optionally determine whether the first device 110 to which corresponds the IP destination address is a trusted or non-trusted device.

In a following optional step S503, the analyser device 130 checks the IP destination address obtained in the step S502 from the detected HTTP request message. To achieve this, the analyser device 130 compares said IP destination address with the contents of the IP addresses database 310. In the scope of the modular arrangement shown in FIG. 3, the step S503 is performed by the URL/IP-based classifier module 303. When the IP destination address is contained in the IP address database 310 and the associated safety indicator is different from "0", then it means that the TCP connection is non-trusted and an error event is consequently generated toward the alarm generator 306. Classifying the TCP connections by relying on such IP destination address allows classifying more easily legitimate HTTP client applications that access one or few domains, such as software update HTTP client applications.

In a following step S504, the analyser device 130 checks whether the IP destination address obtained in the step S502 is contained in the IP addresses database 310. When the IP destination address obtained in the step S502 is contained in the IP addresses database 310, a step S510 is performed; otherwise, a step S505 is performed.

In the optional step S505, the analyser device 130 checks the URL obtained in the step S502 from the detected HTTP request message. To achieve this, the analyser device 130 compares said URL with the contents of the URL database 311. In the scope of the modular arrangement shown in FIG. 3, the step S505 is performed by the URL/IP-based classifier module 303. When the URL is contained in the URLs database 311 and the associated safety indicator is different from "0", then it means that the TCP connection is non-trusted and an error event is consequently generated toward the alarm generator 306. Classifying the TCP connections by relying on such URL allows also classifying more easily legitimate HTTP client applications that access one or few domains, such as software update HTTP client applications.

In a following step S506, the analyser device 130 checks whether the URL obtained in the step S502 is contained in the URLs database 311. When the URL obtained in the step S502 is contained in the URLs database 311, the step S510 is performed; otherwise, a step S507 is performed.

In the step S507, the analyser device 130 builds a signature of the HTTP session from the information obtained in the step S502 from the detected HTTP request message. The analyser device 130 further checks the built signature. To achieve this, the analyser device 130 compares the built signature with the contents of the signatures database 312. In the scope of the modular arrangement shown in FIG. 3, the step S507 is performed by the HTTP signature-based classifier module 304, potentially in conjunction with the user authentication module 305. A detailed embodiment of the step S507 is detailed hereafter with regard to FIG. 6. When the built signature is contained in the signatures database 312 and the associated safety indicator is different from "0", then it means that the TCP connection is non-trusted and an error event is consequently generated toward the alarm generator 306.

In a following step S508, the analyser device 130 checks whether the built signature is contained in the signatures database 312 (either because said signature was present in the signatures database 312 prior to the reception of the HTTP request message, or because the signature has been added by the user authentication module 305). When the built signature is contained in the application database 312, the step S510 is performed; otherwise, a step S509 is performed.

In the step S509, the analyser device 130 generates an alarm. In the scope of the modular arrangement shown in FIG. 3, the step S509 is performed by the alarm generator module 306 from error events generated by the URL/IP-based classifier module 303 when checking the IP destination address and/or the URL contained in the detected HTTP request message, or from error events generated by the HTTP signature-based classifier module 304, or from error events generated by the user authentication module 305.

In the step S510, the analyser device 130 checks whether the safety indicator associated with the IP address found in the IP addresses database 310 (when the step S510 is performed following execution of the step S504) or with the URL found in the URLs database 311 (when the step S510 is performed following execution of the step S506) or with the signature found in the signatures database 312 when the step S510 is performed following execution of the step S508) equals to "0".

When the safety indicator is different from "0", it means that the TCP connection is non-trusted and an error event is consequently generated, as already mentioned, toward the alarm generator 306. The analyser device 130 therefore generates an alarm by executing the step S509. Such an alarm may imply the analyser device 130 withdrawing the TCP segments of the concerned TCP connection without propagating said TCP segments on their route toward their addressee. Such an alarm may in a variant imply the analyser device 130 generating an alarm indication, e.g. a light or a sound, to the attention of the user, with or without withdrawal of said TCP segments. Providing such an alarm indication may also be filling a corresponding line in a log file maintained by the analyser device 130.

When the safety indicator equals "0", it means that the TCP connection is trusted and a step S511 is performed in which the detected HTTP request message is considered as safe.

FIG. 6 schematically represents an algorithm, performed by the analyser device 130, for checking signatures of HTTP sessions, and for, when needed, updating the signatures database 312. The algorithm of FIG. 6 is a detailed embodiment of the step S507. In the scope of the modular arrangement shown in FIG. 3, the algorithm of FIG. 6 is more particularly performed by the HTTP signature-based classifier module 304, except otherwise stated. The algorithm of FIG. 6 attempts finding a signature stored in the signatures database 312 which matches the HTTP request message detected in the step S501.

In a step S600, the analyser device 130 selects a signature stored in the signatures database 312. The stored signature is preferably built according to the format already detailed with regard to FIG. 4.

In a following step S601, the analyser device 130 checks the IP source address, i.e. the IP address of the device having originated the HTTP request message, in order to find out whether the selected signature is applicable for said HTTP request message.

In a following step S602, the analyser device 130 checks whether said IP source address is included into the set of IP source addresses stipulated into the selected signature. When the IP source address is included into the set of IP source addresses stipulated into the selected signature, a step S603 is performed; otherwise, a step S612 is performed.

In the step S603, the analyser device 130 checks the HTTP headers of the HTTP request message, in order to find out whether any HTTP mandatory header stipulated in the selected signature is present in the HTTP request message.

In a following step S604, the analyser device 130 checks whether each HTTP mandatory header stipulated in the selected signature is present in the HTTP request message. When each HTTP mandatory header stipulated in the selected signature is present in the HTTP request message, a step S605 is performed; otherwise, the step S612 is performed.

In the step S605, the analyser device 130 checks the HTTP headers of the HTTP request message, in order to find out whether said HTTP headers are present either in the first list 411 of HTTP mandatory headers or in the second list 412 of HTTP optional headers of the selected signature.

In a following step S606, the analyser device 130 checks whether each HTTP header of the HTTP request message is present either in the first list 411 of HTTP mandatory headers or in the second list 412 of HTTP optional headers of the selected signature. When each HTTP header is present in the selected signature, a step S607 is performed; otherwise, the step S612 is performed.

In the step S607, the analyser device 130 checks the sequence in which the HTTP mandatory headers of the HTTP request message appear, in order to find out whether said sequence matches the sequence of HTTP mandatory headers as stipulated in the selected signature.

In a following step S608, the analyser device 130 checks whether the sequence in which the HTTP mandatory headers of the HTTP request message appear matches the sequence of HTTP mandatory headers as stipulated in the selected signature. When the sequence in which the HTTP headers of the HTTP request message appear matches the sequence of HTTP headers as stipulated in the selected signature, a step S609 is performed; otherwise, the step S612 is performed.

In the step S609, the analyser device 130 checks values present in HTTP mandatory headers of the HTTP request message, in order to find out whether said HTTP headers comprises values as stipulated in the selected signature.

In a following step S610, the analyser device 130 checks whether the HTTP headers of the HTTP request message comprises the values as stipulated in the selected signature. When the HTTP headers of the HTTP request message comprises the values as stipulated in the selected signature, a step S611 is performed; otherwise the step S612 is performed.

In the step S611, the analyser device 130 considers that a signature corresponding to the HTTP request message has been found in the signatures database 312. It means that the HTTP request message belongs to a TCP connection for an application that has already been encountered beforehand. As shown in FIG. 4, the selected signature comprises a safety indicator. This safety indicator is then used to determined whether the HTTP request message belongs to a TCP connection that is trusted or not, as already described with regard to the step S510. The algorithm of FIG. 6 then ends.

In the step S612, the analyser device 130 checks whether all the signatures stored in the signatures database 312 have been considered. When all the signatures stored in the signatures database 312 have been considered, it means that the HTTP request message does not correspond to any signature already stored in the signatures database 312, and a step S613 is performed; otherwise, the step S600 is repeated by selecting a signature, stored in the signatures database 312, that has not yet been considered.

In the step S613, the analyser device 130 launches the authentication procedure, in order to determine whether the HTTP request message has been transmitted by an application trusted by the user. In the scope of the modular arrangement shown in FIG. 3, the authentication procedure is performed by the user authentication module 305 upon request by the HTTP signature-based classifier module 304.

When the authentication procedure succeeds, a corresponding signature is added to the signature database 312 in a step S615 and the step S611 is then performed. The safety indicator in the signature added to the signature database 312 is set, in this case, to "0", as the signature corresponds to trusted TCP connections.

When the authentication procedure does not succeed, in a step S616, the analyser device 130 considers that no signature corresponding to the HTTP request message has been found in the signatures database 312. And the algorithm of FIG. 6 ends. It thus means that, in the scope of the algorithm of FIG. 5, the HTTP request message would imply generating an alarm.

In a variant, when the authentication procedure does not succeed, a corresponding signature is added to the signature database 312 in a step S616 and the step S611 is then performed. The safety indicator in the signature added to the signature database 312 is set, in this case, to a value different from "0", as said signature corresponds to untrusted TCP connections. In this case, the algorithm of FIG. 6 ends by considering that the HTTP request message matches a signature stored in the signatures database 312. It thus means that, in the scope of the algorithm of FIG. 5, the HTTP request message would imply generating an alarm, since the safety indicator associated with the signature matching the HTTP request message is set to a value different from "0".

The authentication procedure aims at determining whether an HTTP client application that has generated the HTTP request message (that couldn't be classified beforehand) is under user's control or hidden from user's control. The aim of the authentication procedure is to clearly differentiate legitimate applications, such as web browsers, from malicious applications, such as malware, rootkit or any software running out of user's control.

In one embodiment, the authentication procedure is as follows: the analyser device 130 sends to the device having originated the HTTP request message an HTTP answer message to redirect to a virtual URL managed by the analyser device 130. The device having originated the HTTP request message then reacts by sending another HTTP request message to the virtual URL and the analyser device 130 replies with a web page that contains a login/password HTML ("HyperText Markup Language") form and preferably a profile selection field. The user is thus expected to fill in the form with a valid login and a valid password, i.e. known beforehand by the analyser device 130. The user is also preferably expected to select, from amongst a pre-defined set of matching profiles, which profile 401 to apply. The device having originated the HTTP request message then transmits to the analyser 130 the login and password entered by the user, as well as, if any, the selected profile.

When the form has been validly filled in, the analyser device 130 considers that the TCP connection is trusted.

When the form has been invalidly filled in, the analyser device 130 considers that the TCP connection is untrusted, potentially after a maximum number of attempts to obtained a validly filled in form.

When no response to the web page has been received after expiry of a predefined time period, the analyser device 130 considers that the TCP connection is untrusted.

In order to simplify the process, the login/password approach can be replaced by a puzzle (as known as "CAPT-CHA", which stands for "Completely Automated Public Turing test to tell Computers and Humans Apart") approach, which is intended to be solved only by humans and not by machines. Such a puzzle is a type of challenge-response test used in computing technologies to determine whether or not the HTTP client application is human. Main benefit is to avoid maintaining a database for storing login and password information.

In the scope of the modular arrangement shown in FIG. 3, the steps of the authentication procedure relative to the analyser device 130 are performed by the user authentication module 305.

In another embodiment, the authentication is performed in collaboration with the supervisor device 121. In this case, the HTTP request message is put on hold during the authentication procedure. The analyser device 130 then communicates with the supervisor device 121 in order to request user authentication, the user being thus expected to fill in the form via the supervisor device. Additional information extracted from the HTTP request message may also be displayed to the user in order to help the user finding out to what HTTP client application is concerned by the authentication procedure. It thus allows declaring trusted applications, i.e. trusted TCP connections, although said applications run on a machine that does not allow displaying a web page.

Interaction with the user in the scope of the authentication procedure may also be performed via a user interface of the analyser device 130. It also thus allows declaring trusted applications, i.e. trusted TCP connections, although said applications run on a machine that does not allow displaying a web page.

In order to build a signature to store in the signatures database 312, the analyser device 130 selects a list of compatible profiles, checking that the HTTP request message is compliant with each of the selected profiles, if any. The analyser device 130 check that all HTTP mandatory headers in each selected profile are present in the HTTP request message and that all headers in the HTTP request message are either listed as HTTP mandatory or optional headers in each selected profile. When more than one profile are selected, the user is expected to select one profile among the list of profiles selected by the analyser device 130. The analyser device 130 further obtains the values for HTTP mandatory headers belonging, in the profile selected by the user, to the list of HTTP mandatory headers whose values has to be checked. The safety indicator is set to "0" to indicate a trusted HTTP client application, i.e. trusted TCP connections, and to a value different from "0" to indicate an untrusted HTTP client application, i.e. untrusted TCP connections. The analyser device 130 further obtains the IP address of the device having originated the HTTP request message. Then, the analyser device 130 fills accordingly in the signature structure 400. When the signature is already present in the signatures database 312 except that the IP address of the device having originated the HTTP request message is not indicated therein, the analyser device 130 updates the IP source address set included in said signature stored in the signatures database 312. It corresponds to simply adding a signature, except that, according to the signature format shown in FIG. 4, the items 411, 412, 413, 414, 422 and 423 are shared for HTTP client applications running on devices identified in the item 424.

FIG. 7 schematically represents an algorithm, performed by the analyser device 130, for adding new entries in the IP addresses database 311. In the scope of the modular arrangement shown in FIG. 3, the algorithm of FIG. 7 is more particularly performed by the domain name analyser module 308, except otherwise stated.

In a step S700, the analyser device 130 receives UDP datagrams. In the scope of the modular arrangement shown in FIG. 3, the step S701 is performed by the UDP analyser module 307.

In a following step S701, the analyser device 130 tries to detect a DNS server response in the received UDP datagram. In the scope of the modular arrangement shown in FIG. 3, the step S701 is also performed by the UDP analyser module 307.

In a following step S702, the analyser device 130 obtains information from the detected DNS server response. Such information is a record, of A-type (IPv4 address) or of AAAA-type (IPv6 address), containing an association of an IP address with domain name information.

In a following step S703, the analyser device 130 checks whether the domain name information obtained from the detected DNS server response is present in the domain names database 313.

In a following step S704, the analyser device 130 checks whether the domain name information obtained from the detected DNS server response has been retrieved from the domain names database 313. When the domain name information obtained from the detected DNS server response has been retrieved from the domain names database 313, a step S706 is performed; otherwise, a step S705 is performed in which the algorithm of FIG. 7 ends.

In the step S706, the analyser device 130 adds a new entry in the IP addresses database 310. The new entry corresponds to the IP address contained in the record in association with the domain name information. Said IP address is then associated in the IP addresses database 310 with a safety indicator that matches the safety indicator associated with said domain name information in the domain names database 313. In a particular embodiment, said IP address is also associated with a predefined time period. The corresponding entry is then removed from the IP addresses database 310 by the analyser device 130 after expiry of said predefined time period.

The algorithm of FIG. 7 thus allows populating the IP addresses database 310. It might be noted that the principles described herein for populating the IP addresses database 310 by analysis of DNS server responses may be implemented independently of any analysis of HTTP session signature.

The invention claimed is:

1. A method for classifying a TCP connection carrying HTTP traffic as a trusted or an untrusted TCP connection, the method being performed by an analyser device, the method comprising:
    detecting an HTTP request message of an HTTP session in the HTTP traffic carried by the TCP connection;
    obtaining, from headers of the detected HTTP request message, information to build a signature of the HTTP session;
    comparing the signature of the HTTP session with signatures stored beforehand by the analyser device in a signatures database;
    classifying the TCP connection as a trusted connection, when the signature of the HTTP session matches a signature that is stored beforehand by the analyser device in the signatures database and that is representative of a trusted HTTP client application;
    performing an authentication procedure, when the signature of the HTTP session does not match any signature stored beforehand by the analyser device in the signatures database, the authentication procedure requesting a user to provide authentication data; and
    adding the signature of the HTTP session in the signatures database, when valid authentication data are provided by the user, the signature of the HTTP session being representative in the signatures database of a trusted HTTP client application, and classifying the TCP connection as a trusted connection; and otherwise, classifying the TCP connection as an untrusted connection,
    wherein the authentication procedure comprises:
    sending a response to a device having originated the detected HTTP request message, said response redirecting the device having originated the detected HTTP request message toward another URL;
    receiving from the device having originated the detected HTTP request message another HTTP request message referring to said another URL;
    sending in response to said another HTTP request message a web page via which the user is able to enter authentication information; and
    when valid authentication information is received, considering the TCP connection as trusted, otherwise considering the TCP connection as untrusted,
    wherein the web page is adapted to enable the user to enter a login and a password as authentication information, and in that the analyser device compares the entered login and passwords with login and password stored beforehand, or in that the web page is adapted to display a CAPTCHA image and enable the user to enter a string, and in that the analyser device compares the entered string with a predefined string corresponding to the displayed CAPTCHA image,
    and wherein the web page is further adapted to enable the user to select a profile from amongst a set of profiles determined by the analyser device as compatible with the detected HTTP request message, each profile including a list of HTTP mandatory headers expected to be present in each HTTP request message compliant with the signature, a list of HTTP optional headers expected to be present in each HTTP request message compliant with the signature, a list of HTTP mandatory headers having specific values to be present in each HTTP request message compliant with the signature, and information representative of a sequence in which the HTTP mandatory headers appear in the detected HTTP request message.

2. The method according to claim 1, wherein, when the TCP connection is classified as an untrusted connection following the authentication procedure, the method further comprises:
    adding the signature of the HTTP session in the signatures database, the signature of the HTTP session being representative in the signatures database of an untrusted HTTP client application.

3. The method according to claim 2, wherein each signature stored in the signatures database is associated with a first safety indicator representative of whether said signature corresponds to a trusted TCP connection or an untrusted TCP connection.

4. The method according to claim 1, wherein the signature of the HTTP session includes information representative of HTTP mandatory headers present in the detected HTTP request message, information representative of HTTP optional headers present in the detected HTTP request message, information representative of a sequence in which the HTTP mandatory headers appear in the detected HTTP request message; and information representative of values contained in predefined fields of the HTTP mandatory headers present in the detected HTTP request message.

5. The method according to claim 1, wherein the signatures stored in the signatures database are associated with a set of at least one IP address, and said method comprises:
    associating the signature of the HTTP session with an IP source address from which is originated the detected HTTP request message, when adding the signature of the HTTP session in the signatures database;
    checking whether the IP source address is associated with any signature stored beforehand in the signatures database, when comparing the signature of the HTTP session with the signatures stored beforehand in the signatures database; and
    considering that the signature of the HTTP session does not match any signature in the signatures database, when no signature in the signatures database is associated with the IP source address.

6. The method according to claim 1, wherein, when valid authentication information is received, the analyser device determines the signature of the HTTP session from the selected profile and headers of the detected HTTP request message.

7. The method according to claim 1, wherein the method comprises:
    obtaining information representative of an IP destination address associated with the detected HTTP request message; and
    attempting classifying the TCP connection as a trusted or an untrusted TCP connection, on the basis of the IP destination address prior to attempting classifying the TCP connection on the basis of the signature.

8. The method according to claim 7, wherein the method comprises:
    comparing the IP destination address with IP addresses stored beforehand in an IP addresses database, each IP address stored in the IP addresses database being associated with a second safety indicator representative of whether said IP address corresponds to a trusted device or an untrusted device, each TCP connection implying a trusted destination device being considered as trusted and each TCP connection implying an untrusted destination device being considered as untrusted.

9. The method according to claim 8, wherein, for populating the IP addresses database, the method comprises:

receiving UDP datagrams;
detecting a DNS server response in the received UDP datagrams;
obtaining, from the detected DNS server response, information of matching between an IP address and domain name information;
checking whether said domain name information is present in a domain name database, said domain name database containing domain names associated with a third safety indicator representative of whether said domain name is trusted or untrusted;
when said domain name information is present in the domain name database, adding to the IP addresses database the IP address matching said domain name information in association with the third safety indicator.

10. The method according to claim 1, wherein the method comprises:
obtaining, from headers of the detected HTTP request message, information representative of an URL to which refers the HTTP request message; and
attempting classifying the TCP connection as a trusted or an untrusted TCP connection, on the basis of the URL prior to attempting classifying the TCP connection on the basis of the signature.

11. The method according to claim 10, wherein the method comprises:
comparing the URL with URLs stored beforehand in a URLs database, each URL stored in the URLs database being associated with a fourth safety indicator representative of whether said URL corresponds to a trusted device or an untrusted device, each TCP connection transporting an HTTP request message referring to a trusted URL being considered as trusted and each TCP connection implying an untrusted URL being considered as untrusted.

12. The method according to claim 1, wherein the analyser device is programmable, and the method is performed by executing program code instructions of a computer program within the programmable analyser device.

13. A device for classifying a TCP connection carrying HTTP traffic as a trusted or an untrusted TCP connection, wherein said device comprises:
processing circuitry
to detect an HTTP request message of an HTTP session in the HTTP traffic carried by the TCP connection;
to obtain, from headers of the detected HTTP request message, information to build a signature of the HTTP session;
to compare the signature of the HTTP session with signatures stored beforehand by the analyser device in a signatures database;
to classify the TCP connection as a trusted connection, when the signature of the HTTP session matches a signature that is stored beforehand by the analyser device in the signatures database and that is representative of a trusted HTTP client application;
to perform an authentication procedure, when the signature of the HTTP session does not match any signature stored beforehand by the analyser device in the signatures database, the authentication procedure requesting a user to provide authentication data;
to add the signature of the HTTP session in the signatures database, when valid authentication data are provided by the user, the signature of the HTTP session being representative in the signatures database of a trusted HTTP client application, and for classifying the TCP connection as a trusted connection; and otherwise, means for classifying the TCP connection as an untrusted connection,
to send a response to a device having originated the detected HTTP request message, said response redirecting the device having originated the detected HTTP request message toward another URL;
to receive from the device having originated the detected HTTP request message another HTTP request message referring to said another URL;
to send in response to said another HTTP request message a web page via which the user is able to enter authentication information; and
to consider, when valid authentication information is received, the TCP connection as trusted, otherwise considering the TCP connection as untrusted,
wherein the web page is adapted to enable the user to enter a login and a password as authentication information, and the analyser device compares the entered login and passwords with login and password stored beforehand, or the web page is adapted to display a CAPTCHA image and enable the user to enter a string, and the analyser device compares the entered string with a predefined string corresponding to the displayed CAPTCHA image,
and wherein the web page is further adapted to enable the user to select a profile from amongst a set of profiles determined by the analyser device as compatible with the detected HTTP request message, each profile including a list of HTTP mandatory headers expected to be present in each HTTP request message compliant with the signature, a list of HTTP optional headers expected to be present in each HTTP request message compliant with the signature, a list of HTTP mandatory headers having specific values to be present in each HTTP request message compliant with the signature, and information representative of a sequence in which the HTTP mandatory headers appear in the detected HTTP request message.

14. A non-transitory computer readable medium storing a computer program comprising program code instructions which, when executed by a computer processor, performs a method for classifying a TCP connection carrying HTTP traffic as a trusted or an untrusted TCP connection, said method comprising:
detecting an HTTP request message of an HTTP session in the HTTP traffic carried by the TCP connection;
obtaining, from headers of the detected HTTP request message, information to build a signature of the HTTP session;
comparing the signature of the HTTP session with signatures stored beforehand by the analyser device in a signatures database;
classifying the TCP connection as a trusted connection, when the signature of the HTTP session matches a signature that is stored beforehand by the analyser device in the signatures database and that is representative of a trusted HTTP client application;
performing an authentication procedure, when the signature of the HTTP session does not match any signature stored beforehand by the analyser device in the signatures database, the authentication procedure requesting a user to provide authentication data; and
adding the signature of the HTTP session in the signatures database, when valid authentication data are provided by the user, the signature of the HTTP session being representative in the signatures database of a trusted HTTP client application, and classifying the TCP connection as a trusted connection; and otherwise, classifying the TCP connection as an untrusted connection,
wherein the authentication procedure comprises:
sending a response to a device having originated the detected HTTP request message, said response redirecting the device having originated the detected HTTP request message toward another URL;
receiving from the device having originated the detected HTTP request message another HTTP request message referring to said another URL;
sending in response to said another HTTP request message a web page via which the user is able to enter authentication information; and
when valid authentication information is received, considering the TCP connection as trusted, otherwise considering the TCP connection as untrusted,
wherein the web page is adapted to enable the user to enter a login and a password as authentication information, and in that the analyser device compares the entered login and passwords with login and password stored beforehand, or in that the web page is adapted to display a CAPTCHA image and enable the user to enter a string, and in that the analyser device compares the entered string with a predefined string corresponding to the displayed CAPTCHA image, and
wherein the web page is further adapted to enable the user to select a profile from amongst a set of profiles determined by the analyser device as compatible with the detected HTTP request message, each profile including a list of HTTP mandatory headers expected to be present in each HTTP request message compliant with the signature, a list of HTTP optional headers expected to be present in each HTTP request message compliant with the signature, a list of HTTP mandatory headers having specific values to be present in each HTTP request message compliant with the signature, and information representative of a sequence in which the HTTP mandatory headers appear in the detected HTTP request message.

* * * * *